(12) United States Patent
Song et al.

(10) Patent No.: US 9,745,202 B2
(45) Date of Patent: Aug. 29, 2017

(54) METAL CYANOMETALLATE SYNTHESIS METHOD

(71) Applicants: Board of Regents, The University of Texas System, Austin, TX (US); Sharp Laboratories of America, Inc., Camas, WA (US)

(72) Inventors: Jie Song, Vancouver, WA (US); Yuhao Lu, Vancouver, WA (US); Long Wang, Vancouver, WA (US)

(73) Assignees: Board of Regents, U of Texas System, Austin, TX (US); Sharp Laboratories of America, Inc, Camas, WA (US)

( * ) Notice: Subject to any disclaimer, the term of this patent is extended or adjusted under 35 U.S.C. 154(b) by 132 days.

(21) Appl. No.: 14/731,607

(22) Filed: Jun. 5, 2015

(65) Prior Publication Data

US 2015/0266746 A1   Sep. 24, 2015

Related U.S. Application Data

(63) Continuation-in-part of application No. 14/271,498, filed on May 7, 2014, now Pat. No. 9,419,278, which
(Continued)

(51) Int. Cl.
*H01M 4/52* (2010.01)
*C01C 3/12* (2006.01)
(Continued)

(52) U.S. Cl.
CPC ............... *C01C 3/12* (2013.01); *H01M 4/58* (2013.01); *H01M 10/054* (2013.01); *Y10T 29/49108* (2015.01)

(58) Field of Classification Search
CPC .................................. H01M 4/58; H01M 4/52
See application file for complete search history.

(56) References Cited

U.S. PATENT DOCUMENTS

2005/0274225 A1* 12/2005 Bocarsly ............... B22F 9/026
75/351

FOREIGN PATENT DOCUMENTS

CN        CN101041123 A   *   9/2007

OTHER PUBLICATIONS

V. D. Neff, "Some Performance Characteristics of a Prussian Blue Battery", Journal of Electrochemical Society 1985, 132, 1382-1384.
(Continued)

*Primary Examiner* — Olatunji Godo
(74) *Attorney, Agent, or Firm* — Law Office of Gerald Maliszewski; Gerald Maliszewski (57) ABSTRACT

A method is provided for synthesizing metal cyanometallate (MCM). The method provides a solution of $A_X M1_Y(CN)_Z$; where "A" is selected from a first group of metals and M1 is selected from a second group of metals. The method adds a material including M2 to the solution to form a liquid phase material that may be either a suspension or a solution. M2 is selected from the second group of metals. The method adds acid to the liquid phase material. The addition of acid to the liquid phase material decomposes the M2 material into M2-ions. Simultaneous with the addition of the acid, a precipitate of $A_N M1_P M2_Q(CN)_R \cdot FH_2O$ is formed, where N is in a range of 1 to 2. A variation of the above-described synthesis method is also provided.

15 Claims, 6 Drawing Sheets

Related U.S. Application Data is a continuation-in-part of application No. 14/230,882, filed on Mar. 31, 2014, now Pat. No. 9,634,317, which is a continuation-in-part of application No. 14/198,755, filed on Mar. 6, 2014, now Pat. No. 9,660,241, which is a continuation-in-part of application No. 14/198,702, filed on Mar. 6, 2014, now Pat. No. 9,583,751, which is a continuation-in-part of application No. 14/198,663, filed on Mar. 6, 2014, now Pat. No. 9,537,131, which is a continuation-in-part of application No. 14/193,782, filed on Feb. 28, 2014, now Pat. No. 9,627,671, which is a continuation-in-part of application No. 14/193,501, filed on Feb. 28, 2014, now Pat. No. 9,406,919, which is a continuation-in-part of application No. 14/174,171, filed on Feb. 6, 2014, now Pat. No. 9,455,431, which is a continuation-in-part of application No. 14/067,038, filed on Oct. 30, 2013, now Pat. No. 9,450,224, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/499,195, filed on Apr. 17, 2012, now Pat. No. 9,559,358, which is a continuation-in-part of application No. 13/432,993, filed on Mar. 28, 2012, now Pat. No. 9,269,953.

(60) Provisional application No. 62/008,869, filed on Jun. 6, 2014.

(51) Int. Cl.
*H01M 4/58* (2010.01)
*H01M 10/054* (2010.01)

(56) References Cited

OTHER PUBLICATIONS

N. Imanishi et al., "Lithium Intercalation Behavior into Iron Cyanide Complex as Positive Electrode of Lithium Secondary Battery", Journal of Power Sources 1999, 79, 215-219.

Y. Lu, L. Wang, J. Cheng, and J. B. Goodenough, "Prussian Blue: a New Framework for Sodium Batteries", Chemistry Communications 2012, 48, 6544-6546.

L. Wang et al., "A Superior Low-Cost Cathode for a Na-ion Battery", Angewandte Chemie International Edition 2013, 52, 1964-1967.

A. Eftekhari, "Potassium Secondary Cell Based on Prussian Blue Cathode", Journal of Power Sources 2004, 126, 221-228.

C. D. Wessells et al., "Copper Hexacyanoferrate Battery Electrodes with Long Cycle Life and High Power", Nature Communications 2011, 2, Article No. 550.

C. D. Wessells et al., "Nickel Hexacyanoferrate Nanoparticle Electrodes for Aqueous Sodium and Potassium Ion Batteries", Nano Letters 2011, 11, 5421-5425.

C. D. Wesells et al., "The Effect of Insertion Species on Nanostrucured Open Framework . . . ", Journal of the Electrochemical Society 2012, 159, A98-A103.

T. Matsuda, M. Takachi, and Y. Moritomo, "A Sodium Manganese Ferrocyanide Thin Film for Na-ion Batteries", Chemical Communications 2013, 49, 2750-2752.

S-H. Yu et al., "Iron Hexacyanoferrate Nanoparticles as Cathode Materials for Lithium and Sodium Rechargeable Batteries", ECS Electrochemistry Letters 2013, 2, A39-A41.

M. Hu and J. S. Jiang, "Facile Synthesis of Air-Stable Prussian White Microcubes via a Hydrothermal Method", Materials Research Bulletin 2011, 46, 702-707.

S-H. Lee and Y-D. Huh, "Preferential Evolution of Prussian Blue's Morphology from Cube to Hexapod", The Bulletin of the Korean Chemical Society 2012, 33, 1078-1080.

M. Hu, J-S. Jiang, C-C. Lin and Y. Zeng, "Prussian Blue Mesocrystals: an Emaple of Self-Construction", CrystEngComm 2010, 12, 2679-2683.

M. Hu, R-P. Ji, and J-S. Jiang, "Hydrothermal Synthesis of Magnetite Crystals: from Sheet to Pseudo-Octahedron", Materials Research Bulletin 2010, 45, 1811-1715.

X. Wu et al., Single-crystal FeFe(CN)6 nanoparticles: a high capacity and high rate cathode for Na-ion batteries, J. Mater. Chem. A., 1(2013)10130-10134.

Y.-G. Guo et al., "High-quality Prussian blue crystals as superior cathode materials for room-temperature . . . ", Energy & Environmental Science, (2014) DOI: 10.1039/C3EE44004D.

* cited by examiner

METAL CYANOMETALLATE SYNTHESIS METHOD

RELATED APPLICATIONS

The application claims the benefit of a Provisional application entitled, METAL CYANOMETALLATE SYNTHESIS METHOD, invented by Jie Song et al, Ser. No. 62/008,869, filed Jun. 6, 2014.

This application is a Continuation-in-Part of an application entitled, RECHARGEABLE METAL-ION BATTERY WITH NON-AQUEOUS HYBRID ION ELECTROLYTE, invented by Long Wang et al, Ser. No. 14/271,498, filed May 7, 2014;

which is a Continuation-in-Part of an application entitled, REACTIVE SEPARATOR FOR A METAL-ION BATTERY, invented by Long Wang et al, Ser. No. 14/230,882, filed Mar. 31, 2014;

which is a Continuation-in-Part of an application entitled, NASICON-POLYMER ELECTROLYTE STRUCTURE, invented by Long Wang et al, Ser. No. 14/198,755, filed Mar. 6, 2014;

which is a Continuation-in-Part of an application entitled, BATTERY WITH AN ANODE PRELOADED WITH CONSUMABLE METALS, invented by Yuhao Lu et al, Ser. No. 14/198,702, filed Mar. 6, 2014;

which is a Continuation-in-Part of an application entitled, BATTERY ANODE WITH PRELOADED METALS, invented by Long Wang et al, Ser. No. 14/198,663, filed Mar. 6, 2014;

which is a Continuation-in-Part of an application entitled, METAL BATTERY ELECTRODE WITH PYROLYZED COATING, invented by Yuhao Lu et al, Ser. No. 14/193,782, filed Feb. 28, 2014;

which is a Continuation-in-Part of an application entitled, METAL HEXACYANOMETALLATE ELECTRODE WITH SHIELD STRUCTURE, invented by Yuhao Lu et al, Ser. No. 14/193,501, filed Feb. 28, 2014;

which is a Continuation-in-Part of an application entitled, CYANOMETALLATE CATHODE BATTERY AND METHOD FOR FABRICATION, invented by Yuhao Lu et al, Ser. No. 14/174,171, filed Feb. 6, 2014;

This application is a Continuation-in-Part of an application entitled, SODIUM IRON(II)-HEXACYANOFERRATE(II) BATTERY ELECTRODE AND SYNTHESIS METHOD, invented by Yuhao Lu et al, Ser. No. 14/067,038, filed Oct. 30, 2013;

which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013;

which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013, now U.S. Pat. No. 8,968,925, issued on Mar. 3, 2015;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012, now U.S. Pat. No. 8,957,796, issued on Feb. 17, 2015;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical cells and, more particularly, to a method for synthesizing metal cyanometallates (MCMs) for use in battery electrodes.

2. Description of the Related Art

Large-capacity, cost-effective energy storage is the transformational technology needed to enable the large scale integration of renewable energy (e.g. wind, solar). The rechargeable battery offers efficient electrical energy storage (EES). The lithium (Li)-ion battery has been the leading option based on its performance, but it is too expensive for large-scale EES. Therefore, it is necessary to develop superior low cost, high-performance electrode materials to reduce the cost of lithium-ion batteries or to develop a new system of rechargeable metal-ion batteries to replace lithium-ion batteries.

Sodium and potassium-ion batteries have attracted a great deal of attention recently because the reserves of sodium/potassium are more plentiful than lithium in the crust of earth. This abundance makes it possible to develop low cost batteries for EES. However, it is impractical to copy the structures of lithium-ion ($Li^+$)-host compounds for use as sodium-ion ($Na^+$) or potassium-ion ($K^+$)-host compounds. Sodium and potassium ions are much larger than lithium ions and severely distort the structures of the $Li^+$-host compounds. Thus, it is very important that new $Na^+/K^+$-host materials be developed, with a large interstitial space into which sodium/potassium-ions can easily and reversibly move. $Na^+/K^+$-ions have been inserted into metal cyanide compounds. Transition metal hexacyanoferrates (TMHCFs) with large interstitial space have been investigated as cathode materials for rechargeable lithium-ion batteries [1,2], sodium-ion batteries [3,4], and potassium-ion batteries [5]. With an aqueous electrolyte containing the proper alkali-ions or ammonium-ions, copper and nickel hexacyanoferrates [(Cu,Ni)-HCFs] demonstrated robust cycling life with 83% capacity retention after 40,000 cycles at a charge/discharge current of 17 C (1 C=150 milliamp hours per gram (mAh/g) [6-8]. In spite of this, the materials demonstrated low capacities and energy densities because: (1) only one sodium-ion can be inserted/extracted reversibly into/from Cu-HCF or Ni-HCF per formula unit, and (2) these TM-HCFs electrodes must be operated below 1.23 V due to the water electrochemical window. The electrochemical window of a substance is the voltage range between which the substance is neither oxidized nor reduced. This range is important for the efficiency of an electrode, and once out of this range, water becomes electrolyzed, spoiling the electrical energy intended for another electrochemical reaction.

In order to compensate for these shortcomings, manganese hexacyanoferrate (Mn-HCF) and iron hexacyanoferrate (Fe-HCF) were used as cathode materials in non-aqueous electrolyte [9, 10]. When assembled with a sodium-metal anode, Mn-HCF and Fe-HCF electrodes cycled between 2.0V and 4.2 V delivered capacities of ~110 mAh/g. Very recently, $FeFe(CN)_6 \cdot 4H_2O$ and $Na_{0.61}Fe[Fe(CN)_6]_{0.94}$ were reported to exhibit high energy density and power density and good stability during cycling [11, 12].

Figure 1:
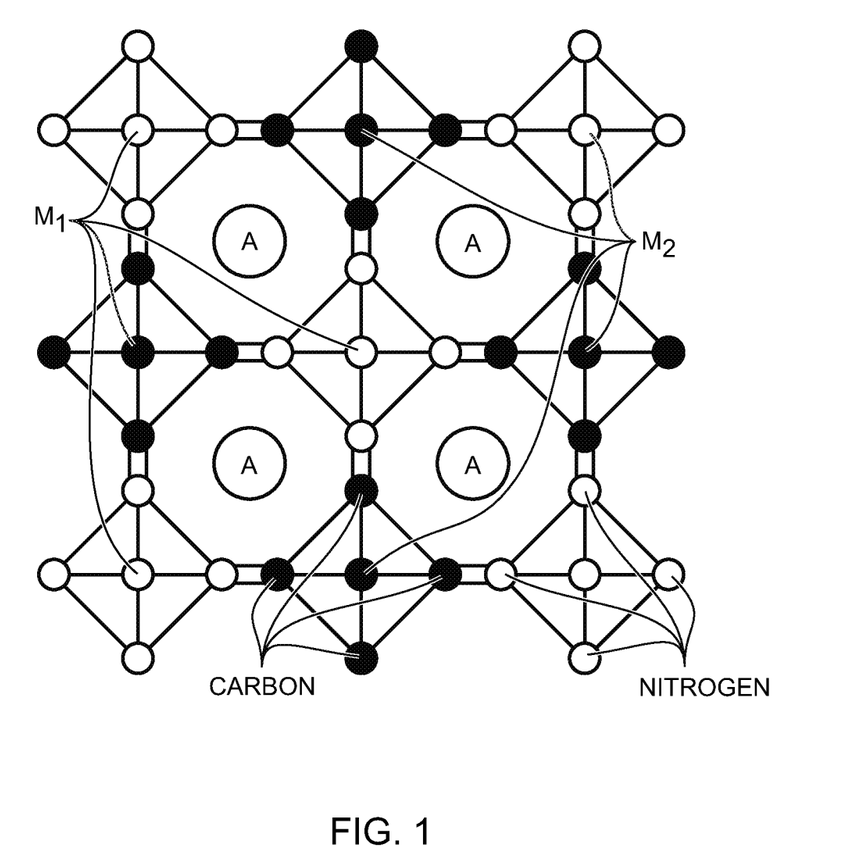
FIG. 1 is a diagram representing a metal cyanometallate (MCM) open framework (prior art).

FIG. 1 is a diagram representing a metal cyanometallate (MCM) open framework (prior art). All the compounds mentioned above can be categorized as MCMs with the general formula $A_XM1_MM2_N(CN)_Z$. The open framework structure of the transition metal MCM facilitates both rapid and reversible intercalation processes for alkali and alkaline ions ($A_X$). Some typical "A" metals include lithium (Li), sodium (Na), potassium (K), rubidium (Rb), cesium (Cs), calcium (Ca), strontium (Sr), barium (Ba), silver (Ag), aluminum (Al), magnesium (Mg), etc. Typical M1, M2 materials include titanium (Ti), vanadium (V), chromium (Cr), manganese (Mn), iron (Fe), cobalt (Co), nickel (Ni), copper (Cu), zinc (Zn), niobium (Nb), ruthenium (Ru), tin (Sn), indium (In), cadmium (Cd), Ca, and Mg.

The MCM capacity is determined by the available A-sites in the compounds into which the alkali or alkaline ions can be inserted reversibly in the range of working voltages. From the electric neutrality point of view, the valences of M1 and M2 mainly contribute to the amount of the available A-sites. For example, 2 sodium-ions can be inserted/extracted into/from $Na_2MnFe(CN)_6$ between 2-4 V vs. Na° because the valences of Mn- and Fe-ions can change between +2 and +3, and its theoretical capacity is 171 mAh/g. Noteworthy is the fact that a greater number of metal-ions, "A", result in MCMs able to deliver a higher capacity for use in a metal-ion battery with a non-metal counter electrode. In addition, in order to neutralize charges, the transition metals are kept at low valances. In typical MCM materials ($A_XM1_NM2_M(CN)_Z \cdot dH_2O$) the value of x is less than or equal to 1.

It would be advantageous if a synthesis process existed to increase the number of "A" metal-ions in MCM materials.

[1] V. D. Neff, Some performance characteristics of a Prussian Blue battery, Journal of Electrochemical Society, 132 (1985) 1382-1384.
[2] N. Imanishi, T. Morikawa, J. Kondo, Y. Takeda, O. Yamamoto, N. Kinugasa, T. Yamagishi, Lithium intercalation behavior into iron cyanide complex as positive electrode of lithium secondary battery, journal of Power Sources, 79 (1999) 215-219.
[3] Y. Lu, L. Wang, J. Cheng, J. B. Goodenough, Prussian blue: a new framework for sodium batteries, Chemistry Communication, 48 (2012) 6544-6546.
[4] L. Wang, Y. Lu, J. Liu, M. Xu, J. Cheng, D. Zhang, Goodenough, A superior low-cost cathode for a Na-ion battery, Angew. Chem. Int. Ed., 52 (2013) 1964-1967.
[5] A. Eftekhari, Potassium secondary cell based on Prussian blue cathode, J. Power Sources, 126 (2004) 221-228.
[6] C. D. Wessells, R. A. Huggins, Y. Cui, Copper hexacyanoferrate battery electrodes with long cycle life and high power, Nature Communication, 2 (2011) 550.
[7] C. D. Wessells, S. V. Peddada, R. A. Huggins, Y. Cui, Nickel hexacyanoferrate nanoparticle electrodes for aqueous sodium and potassium ion batteries. Nano Letter, 11(2011) 5421-5425.
[8] C. D. Wessells, S. V. Peddada, M. T. McDowell, R. A. Huggins, Y. Cui, The effect of insertion species on nanostructured open framework hexacyanoferrate battery electrode, J. Electrochem. Soc., 159 (2012) A98-A103.
[9] T. Matsuda, M. Takachi, Y. Moritomo, A sodium manganese ferrocyanide thin film for Na-ion batteries, Chemical Communications, DOI: 10.1039/C3CC38839E.
[10] S.-H. Yu, M. Shokouhimehr, T. Hyeon, Y.-E. Sung, Iron hexacyanoferrate nanoparticles as cathode materials for lithium and sodium rechargeable batteries, ECS Electrochemistry Letters, 2 (2013) A39-A41.
[11] X. Wu, W. Den, J. Qian, Y. Cao, X. Ai, H. Yang, Single-crystal FeFe(CN)6 nanoparticles: a high capacity and high rate cathode for Na-ion batteries, J. Mater. Chem. A., 1(2013)10130-10134.
[12] Y.-G. Guo, Y. You, X.-L. Wu, Y.-X. Yin, High-quality Prussian blue crystals as superior cathode materials for room-temperature sodium-ion batteries, Energy & Environmental Science, (2014) DOI: 10.1039/C3EE44004D

SUMMARY OF THE INVENTION

Disclosed herein are methods for synthesizing metal cyanometallates (MCMs) with the general formula $A_NM1_PM2_Q(CN)_R$ such that the value of N is greater than that obtained using conventional processes, for use in metal-ion batteries. In some cases, water molecules can occupy the interstitial or lattice positions to form $A_NM1_PM2_Q(CN)_R \cdot FH_2O$. Typically, "A" may be lithium (Li), sodium (Na), potassium (K), rubidium (Rb), cesium (Cs), calcium (Ca), strontium (Sr), barium (Ba), silver (Ag), aluminum (Al), magnesium (Mg), or combinations thereof. M1 and M2 may be titanium (Ti), vanadium (V), chromium (Cr), manganese (Mn), iron (Fe), cobalt (Co), nickel (Ni), copper (Cu), zinc (Zn), niobium (Nb), ruthenium (Ru), tin (Sn), indium (In), cadmium (Cd), Ca, Mg, strontium (Sr), or barium (Ba). The synthesis methods increase the available interstitial positions for "A"-ion intercalation into MCM compounds and improve MCM capacities for their use in metal-ion batteries.

In one aspect, the materials are synthesized with a solution containing $M1_{a2}(CN)_{z2}{}^{b-}$-ions and materials containing M2. Generally, a high concentration of "A"-ions is included in the solution. An acid is added into the synthesis solution to decompose the M2-containing materials to form M2-ions that interact with $M1_{a2}(CN)_{z2}{}^{b-}$-ions to form a framework. The synthesis may be carried out at a controlled temperature from 0 Centigrade (C.) to 100° C. in an inert atmosphere such as nitrogen and/or argon. To neutralize charges, "A"-ions occupy the interstitial positions of the framework. A precipitation is formed that can be vacuum dried at a temperature in the range of 0° C. to 200° C.

Accordingly, a first method is provided for synthesizing metal cyanometallate, (MCM). The method provides a solution of $A_XM1_Y(CN)_Z$;

where "A" is selected from a first group of metals;
where M1 is selected from a second group of metals;
where X is in the range of 0 to 10;
where Y is in the range of 1 to 10; and,
where Z is in the range of 1 to 10.

The method adds a material including M2 to the solution to form a liquid phase material that may be either a suspension or a solution. M2 is selected from the second group of metals. The material may be pure M2 and it may be an oxide, sulfide, sulfite, carbonate, cyanide, or fluoride compound. The method adds acid to the liquid phase material. The addition of acid to the liquid phase material decomposes the M2 material into M2-ions. In one aspect, the method additionally adds a reducing agent to the liquid phase material. Simultaneous with the addition of the acid, a precipitate of $A_N M1_P M2_Q(CN)_R \cdot FH_2O$ is formed:

where N is in the range of 1 to 2;
where P is less than or equal to 2;
where F is in the range of 0 to 20;
where Q is less than or equal to 2; and,
where R is less than or equal to 6.

Additional details of the above-described first method, as well as a second method, are presented below.

DETAILED DESCRIPTION

Disclosed herein are methods for the synthesis of metal cyanometallates (MCMs) or $A_N M1_P M2_Q(CN)_R \cdot FH_2O$ as the electrode in rechargeable metal-ion batteries. The metal-ions can be from metal lithium (Li), sodium (Na), potassium (K), rubidium (Rb), caesium (Cs), calcium (Ca), and/or magnesium (Mg). Some examples of transition metal M1 and M2 include titanium (Ti), vanadium (V), chromium (Cr), manganese (Mn) iron (Fe), cobalt (Co), nickel (Ni), copper (Cu), zinc (Zn), niobium (Nb), ruthenium (Ru), tin (Sn), indium (In), and cadmium (Cd).

In general, the precipitation method is used to synthesize MCM materials as electrodes. However, noteworthy is the fact that metal-ions with low valence are susceptible to being oxidized, resulting in low-"A" containing MCM. The "A" deficiency causes a low capacity when MCM is used as an electrode in a rechargeable "A"-ion battery with a counter electrode without "A"-ions. For example, Prussian white, $Na_2FeFe(CN)_6$ is expected to be synthesized with ferrous ions and ferrocyanide. But, the fact is that only Prussian blue, $Na_xFeFe(CN)_6$ (x<1), can conventionally be obtained because ferrous ions are easily oxidized.

Figure 2:
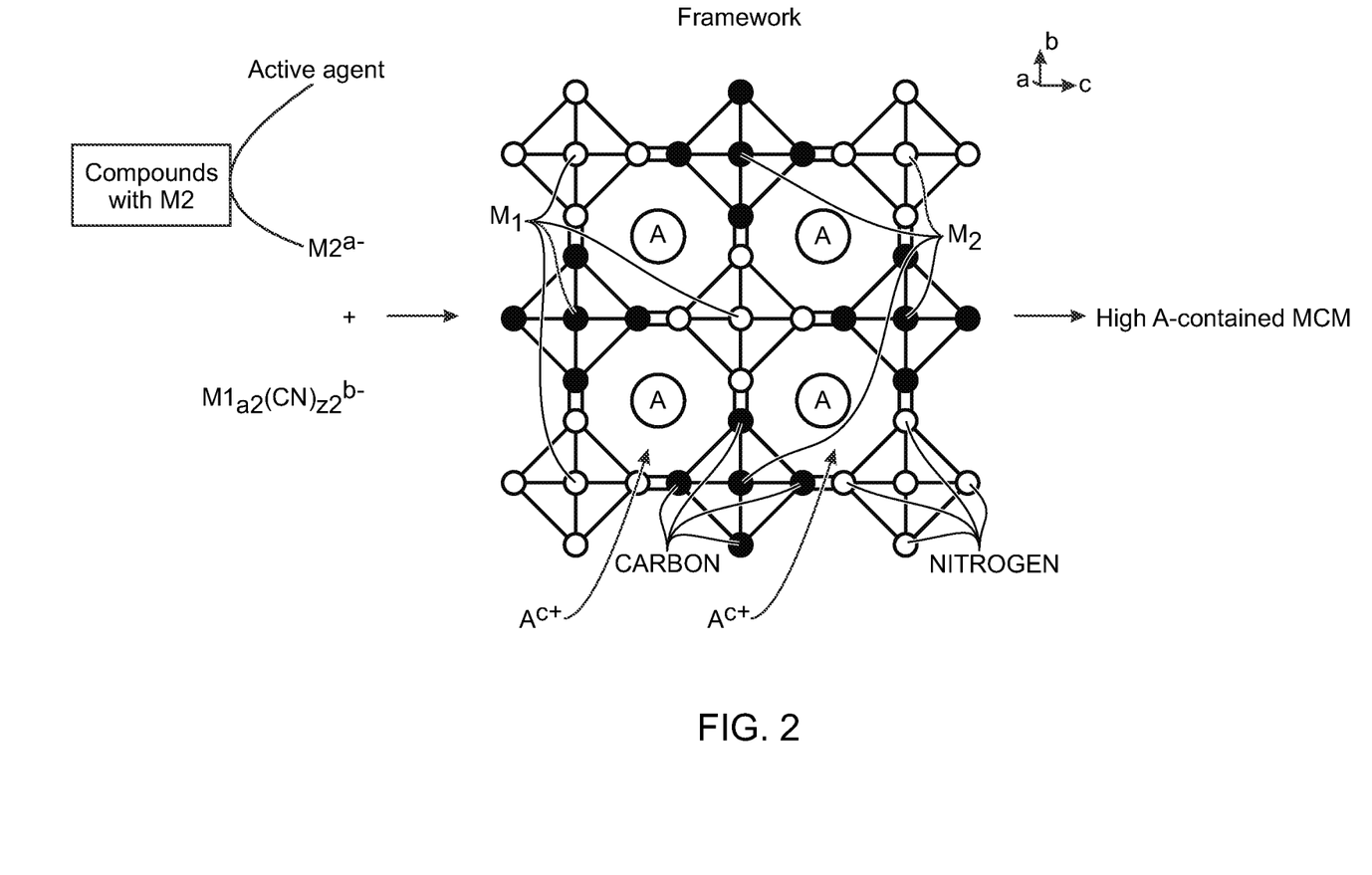
FIG. 2 is a diagram generally depicting a process for synthesizing MCM with a high content of "A"-ions.

FIG. 2 is a diagram generally depicting a process for synthesizing MCM with a high content of "A"-ions. To obtain a MCM electrode with a high capacity for use as a battery electrode, new approaches must be adopted to reduce the possibility of metal oxidation during synthesis. Disclosed herein is a "simultaneous" synthesis process where M2-ions, from the decomposition of stable M2 materials, immediately react with an M1-cyanide with a minimum possibility of oxidization. A reductive environment is used to protect the M1-ions from oxidizing.

To clarify the process, two examples are given here.

Method 1:

0.7 grams (g) iron (Fe) powder was mixed with 100 milliliters (mL) 0.02 moles (mol) $L^{-1}$ $Na_4Fe(CN)_4 \cdot 10H_2O$ solution to form a suspension. As used herein, a suspension is understood to be a heterogeneous mixture containing solid particles that are sufficiently large for sedimentation. The internal phase (solid) is dispersed throughout the external phase (fluid) through mechanical agitation, with the use of certain excipients or suspending agents. Generally, without agitation, the solid particles will eventually settle. A solution is a homogeneous mixture composed of only one phase. In such a mixture, a solute is a substance dissolved in another substance, known as a solvent. The solvent does the dissolving. The solution more or less takes on the characteristics of the solvent including its phase, and the solvent is commonly the major fraction of the mixture. The concentration of a solute in a solution is a measure of how much of that solute is dissolved in the solvent.

Continuing the description of the method, 10 mL 0.1 mol $L^{-1}$ hydrogen chloride (HCl) solution was added into the suspension and stirred at room temperature. The Fe was decomposed by the to form $Fe^{2+}$, which reacted with ferrocynide immediately to form $Na_2FeFe(CN)_2$. The obtained precipitate was collected by centrifuge or filtration, washed by water, and dried at 0-200° C. in a vacuum oven for 6-20 hours.

Method 2:

In a typical synthesis, 2 millimoles (mmol) $Na_4Fe(CN)_4 \cdot 10H_2O$ and 0.1 mL HCl (37%) was dissolved in 500 mL of distilled water to obtain a homogenous solution. The solution was maintained at 0-100° C. for 0.5-60 hours being vigorous stirred to obtain $Na_2FeFe(CN)_6$. In the reaction, $Fe^{2+}$-ions result from the decomposition of ferrocynide by HCl. The precipitate was collected by filtration in air, washed by water, and dried at 0-200° C. in a vacuum over for 0.5-60 hours.

Figure 3:
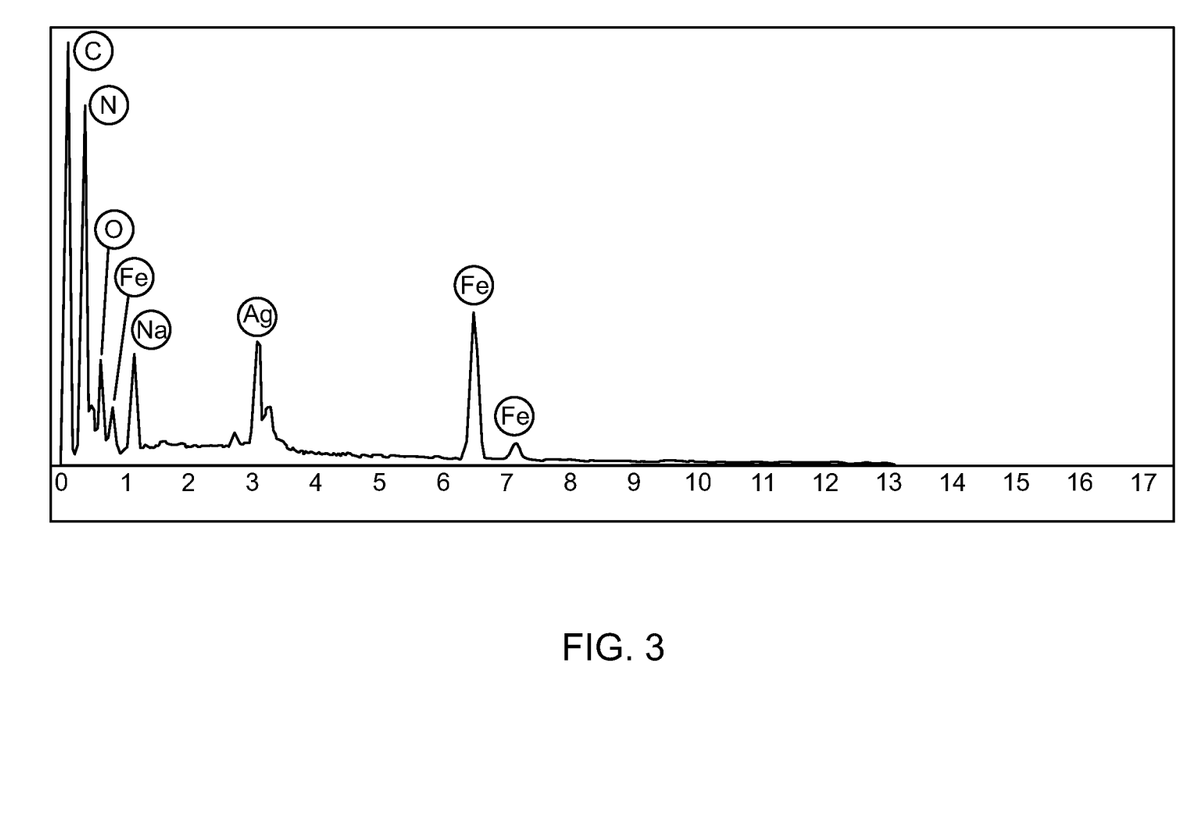
FIG. 3 is the energy-dispersive X-ray spectroscopy (EDX) spectrum of a $Na_2FeFe(CN)_6$ sample prepared by the above-described second precipitation method.

FIG. 3 is the energy-dispersive X-ray spectroscopy (EDX) spectrum of a $Na_2FeFe(CN)_6$ sample prepared by the above-described second precipitation method. A high concentration of Na was observed in the as-prepared material. Silver (Ag) was coated on the material to increase conductivity for scanning electron microscope (SEM) characterization.

Figure 4:
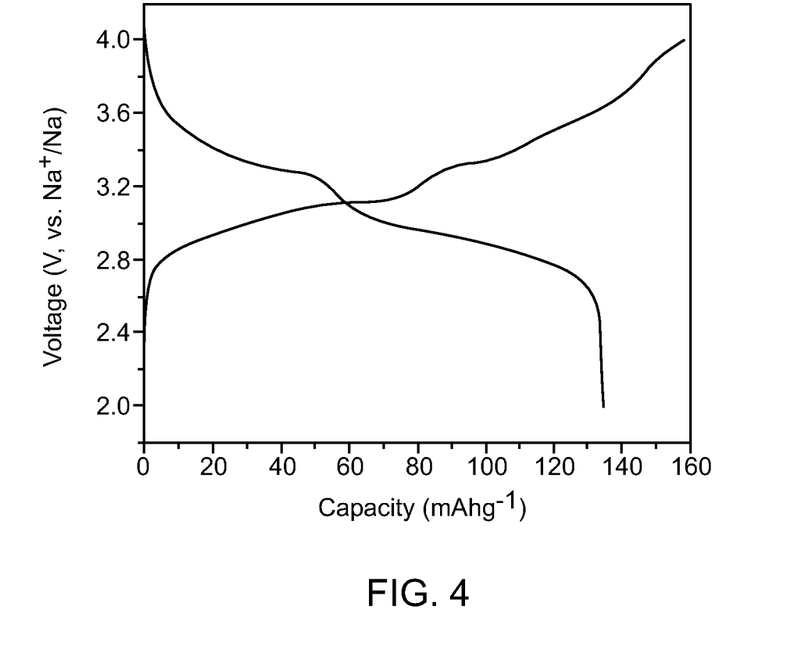
FIGS. 4 and 5 are charge and discharge curves of $Na_2FeFe(CN)_6$ prepared by Method 1 and Method 2, respectively.
Figure 5:
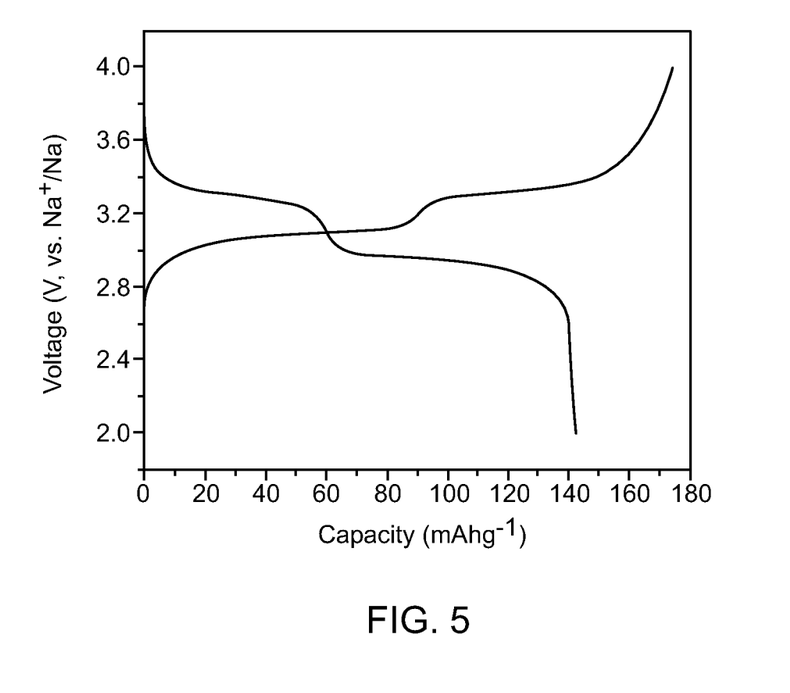

FIGS. 4 and 5 are charge and discharge curves of $Na_2FeFe(CN)_6$ prepared by Method 1 and Method 2, respectively. Two plateaus at 3.0 and 3.4 V during charge and discharge were observed with a very small polarization. $Na_2FeFe(CN)_6$ prepared by precipitation in aqueous solution delivers a high capacity of 120-145 milliamp hours per gram (mAh/g).

Figure 6:
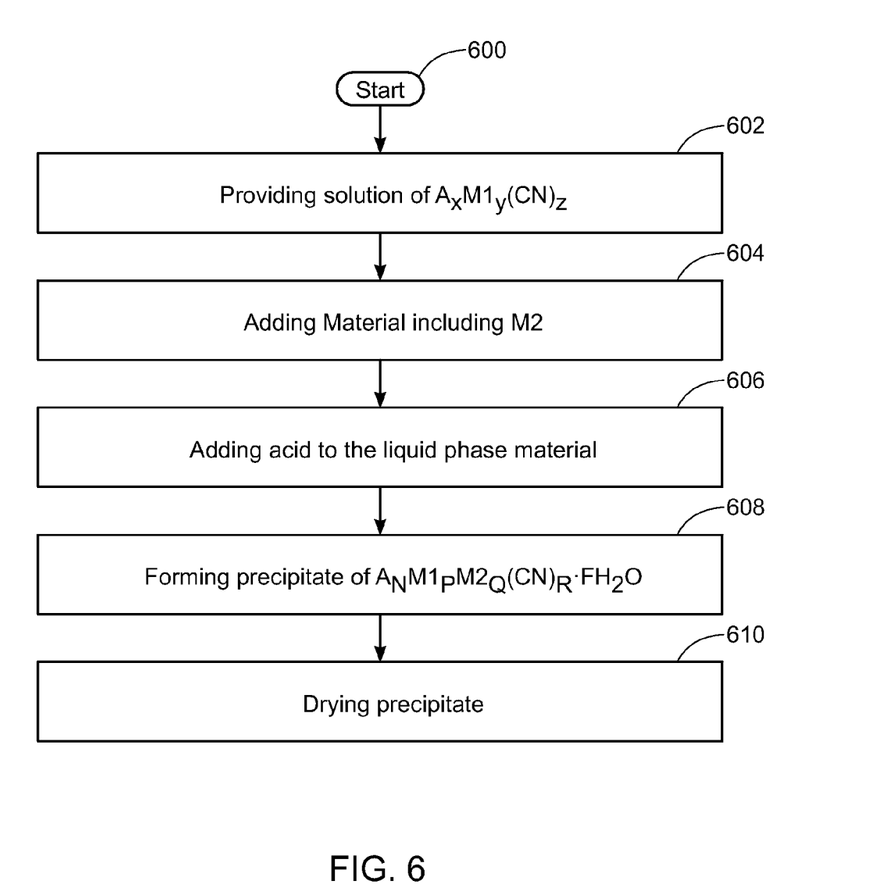
FIG. 6 is a flowchart illustrating a method for synthesizing metal cyanometallate (MCM).

FIG. 6 is a flowchart illustrating a method for synthesizing metal cyanometallate (MCM). Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 600.

Step 602 provides a solution of $A_X M1_Y(CN)_Z$;
where "A" is selected from a first group of metals;
where M1 is selected from a second group of metals;
where x is in the range of 0 to 10;
where y is in the range of 1 to 10; and,
where z is in the range of 1 to 10.

Some examples from the first group of metals include lithium (Li), sodium (Na), potassium (K), rubidium (Rb), cesium (Cs), calcium (Ca), strontium (Sr), barium (Ba), silver (Ag), aluminum (Al), magnesium (Mg), and combinations thereof.

Step 604 adds a material including M2 to the solution to form a liquid phase material that is either a suspension or a solution. M2 is selected from the second group of metals. The M2 material may be pure M2 or a compound of oxides, sulfides, sulfites, carbonates, cyanides, fluorides, or a combination of these compounds. M1 and M2 are each independently selected from the second group of metals, some examples of which include titanium (Ti), vanadium (V), chromium (Cr), manganese (Mn), iron (Fe), cobalt (Co), nickel (Ni), copper (Cu), zinc (Zn), niobium (Nb), ruthenium (Ru), tin (Sn), indium (In), cadmium (Cd), Ca, Mg, strontium (Sr), and barium (Ba). Note: the materials listed above are examples used to illustrate the invention and do not necessarily represent an exhaustive list of all possible materials.

Step 606 adds an acid to the liquid phase material. Some examples of acids include hydrochloric acid (HCl), sulfuric acid ($H_2SO_4$), sulfurous acid ($H_2SO_3$), acetic acid ($CH_3COOH$), formic acid (CHOOH), oxalic acid ($C_2H_2O_4$), and ascorbic acid. In one aspect, adding the acid to the liquid phase material in Step 606 includes the acid decomposing the M2 material into M2-ions.

Optionally, adding the acid to the liquid phase material in Step 606 may additionally include adding a reducing agent to the liquid phase material. Some examples of reducing agents include sodium borohydride, sodium hyposulfite, sodium sulfite, and polyvinylpyrrolidon. In one aspect, adding the acid to the liquid phase material includes adding the acid to the liquid phase material in an inert atmosphere. For example, the process may be performed in an atmosphere of argon or nitrogen.

Simultaneously with the addition of the acid in Step 606, Step 608 forms a precipitate of $A_N M1_P M2_Q(CN)_R \cdot FH_2O$;
where N is in the range of 1 to 2;
where P is less than or equal to 2;
where F is in the range of 0 to 20;
where Q is less than or equal to 2; and,
where R is less than or equal to 6.

In one aspect, Step 610 dries the precipitate in a vacuum environment at a temperature in the range between 0 and 200 degrees C.

Figure 7:
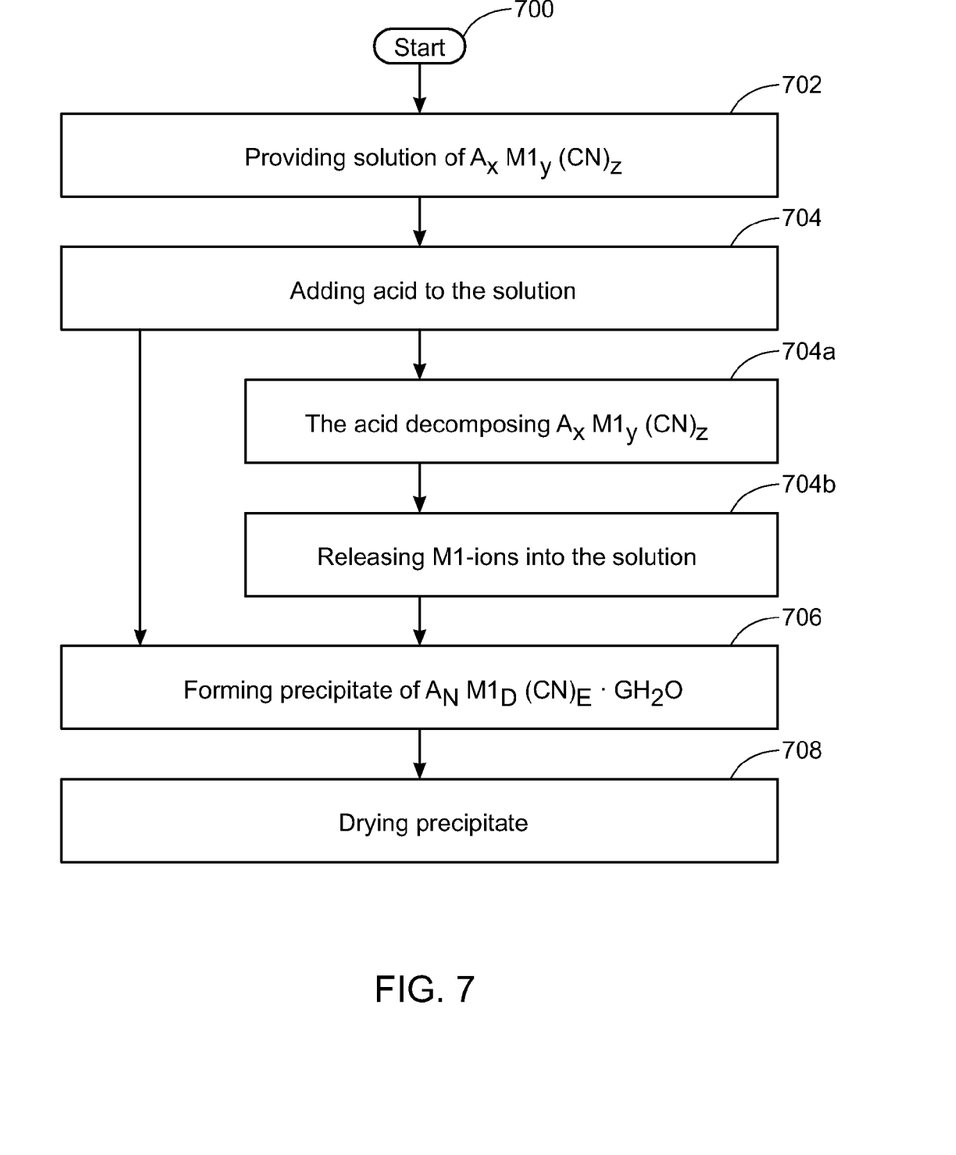
FIG. 7 is a flowchart illustrating another method for synthesizing MCM.

FIG. 7 is a flowchart illustrating another method for synthesizing MCM. The method begins at Step 700. Step 702 provides a solution of $A_X M1_Y(CN)_Z$;
where "A" is selected from a first group of metals;
where M1 is selected from a second group of metals;
where x is in the range of 0 to 10;
where y is in the range of 1 to 10; and,
where z is in the range of 1 to 10.

As mentioned above in the description of FIG. 6, examples from the first group of metals include Li, Na, K, Rb, Cs, Ca, Sr, Ba, Ag, Al, Mg, and combinations thereof. Examples from the second group of metals include Ti, V, Cr, Mn, Fe, Co, Ni, Cu, Zn, Nb, Ru, Sn, In, Cd, Ca, Mg, Sr, and Ba.

Step 704 adds an acid to the solution. In one aspect, Step 704 includes the following substeps. In step 704a the acid decomposes the $A_X M1_Y(CN)_Z$. Step 704b releases M1-ions into the solution. Some examples of acids include HCl, $H_2SO_4$, $H_2SO_3$, $CH_3COOH$, CHOOH, $C_2H_2O_4$, and ascorbic acid. In one aspect, Step 704 optionally includes adding a reducing agent to the solution, in addition to the acid. Some examples of reducing agents include sodium borohydride, sodium hyposulfite, sodium sulfite, and polyvinylpyrrolidon. In another aspect, the acid is added to the solution in an inert atmosphere. Note: the materials listed above are examples used to illustrate the invention and do not necessarily represent an exhaustive list of all possible materials.

Simultaneously with the addition of the acid in Step 704, Step 706 forms a precipitate of $A_N M1_D(CN)_E \cdot GH_2O$;
where N is in the range of 1 to 2;
where G is in the range of 0 to 20;
where D is less than or equal to 2; and,
where E is less than or equal to 6.

In one aspect, Step 708 dries the precipitate in a vacuum environment at a temperature in the range between 0 and 200 degrees C.

Processes for the synthesis of MCM have been provided. Examples of particular materials and process details have been presented to illustrate the invention. However, the invention is not limited to merely these examples. Other variations and embodiments of the invention will occur to those skilled in the art.

We claim:

1. A method for synthesizing metal cyanometallate (MCM), the method comprising:
   providing a solution of $A_X M1_Y(CN)_Z$;
      where "A" is selected from a first group of metals consisting of lithium (Li), sodium (Na), potassium (K), rubidium (Rb), cesium (Cs), calcium (Ca), strontium (Sr), barium (Ba), silver (Ag), aluminum (Al), magnesium (Mg), and combinations thereof;
      where M1 is selected from a second group of metals consisting of titanium (Ti), vanadium (V), chromium (Cr), manganese (Mn), iron (Fe), cobalt (Co), nickel (Ni), copper (Cu), zinc (Zn), niobium (Nb), ruthenium (Ru), tin (Sn), indium (In), cadmium (Cd), Ca, Mg, strontium (Sr), and barium (Ba);
      where x is in a range of 0 to 10;
      where y is in a range of 1 to 10;
      where z is in a range of 1 to 10;
   adding a material including M2 to the solution to form a liquid phase material selected from a group consisting of a suspension and a solution;
      where M2 is selected from the second group of metals;
   adding an acid to the liquid phase material;
   simultaneously with the addition of the acid, forming a precipitate of $A_N M1_P M2_Q(CN)_R \cdot FH_2O$;
      where N is in a range of 1 to 2;
      where P is less than or equal to 2;
      where F is in a range of 0 to 20;
      where Q is less than or equal to 2; and,
      where R is less than or equal to 6.

2. The method of claim 1 wherein adding the acid to the liquid phase material includes the acid decomposing the material including M2 into M2-ions.

3. The method of claim 1 wherein adding the acid to the liquid phase material includes adding an acid selected from a group consisting of hydrochloric acid (HCl), sulfuric acid ($H_2SO_4$), sulfurous acid ($H_2SO_3$), acetic acid ($CH_3COOH$), formic acid (CHOOH), oxalic acid ($C_2H_2O_4$), and ascorbic acid.

4. The method of claim 1 wherein adding the acid to the liquid phase material includes additionally adding a reducing agent to the liquid phase material.

5. The method of claim 4 wherein adding the reducing agent to the liquid phase material includes adding a reducing agent selected from a group consisting of sodium borohydride, sodium hyposulfite, sodium sulfite, and polyvinylpyrrolidon.

6. The method of claim 1 wherein adding the acid to the liquid phase material includes adding the acid to the liquid phase material in an inert atmosphere.

7. The method of claim 1 further comprising:
drying the precipitate in a vacuum environment at a temperature in a range between 0 and 200 degrees Centigrade (C.).

8. The method of claim 1 wherein adding the material including M2 to the solution includes adding a material selected from a group consisting of pure M2 and compounds selected from a group consisting of oxides, sulfides, sulfites, carbonates, cyanides, and fluorides.

9. A method for synthesizing metal cyanometallate (MCM), the method comprising:
providing a solution of $A_X M1_Y (CN)_Z$;
where "A" is selected from a first group of metals consisting of lithium (Li), sodium (Na), potassium (K), rubidium (Rb), cesium (Cs), calcium (Ca), strontium (Sr), barium (Ba), silver (Ag), aluminum (Al), magnesium (Mg), and combinations thereof;
where M1 is selected from a second group of metals selected from a group consisting of titanium (Ti), vanadium (V), chromium (Cr), manganese (Mn), iron (Fe), cobalt (Co), nickel (Ni), copper (Cu), zinc (Zn), niobium (Nb), ruthenium (Ru), tin (Sn), indium (In), cadmium (Cd), Ca, Mg, strontium (Sr), and barium (Ba);
where X is in a range of 0 to 10;
where Y is in a range of 1 to 10;
where Z is in a range of 1 to 10;
adding an acid to the solution;
simultaneously with the addition of the acid, forming a precipitate of $A_N M1_D (CN)_E \cdot G H_2 O$;
where N is in a range of 1 to 2;
where G is in a range of 0 to 20;
where D is less than or equal to 2; and,
where E is less than or equal to 6.

10. The method of claim 9 wherein adding the acid to the solution includes:
the acid decomposing the $A_X M1_Y (CN)_Z$; and,
releasing M1-ions into the solution.

11. The method of claim 9 wherein adding the acid to the solution includes adding an acid selected from a group consisting of hydrochloric acid (HCl), sulfuric acid ($H_2SO_4$), sulfurous acid ($H_2SO_3$), acetic acid ($CH_3COOH$), formic acid (CHOOH), oxalic acid ($C_2H_2O_4$), and ascorbic acid.

12. The method of claim 9 wherein adding the acid to the solution includes additionally adding a reducing agent to the solution.

13. The method of claim 12 wherein adding the reducing agent to the solution includes adding a reducing agent selected from a group consisting of sodium borohydride, sodium hyposulfite, sodium sulfite, and polyvinylpyrrolidon.

14. The method of claim 9 wherein adding the acid to the solution includes adding the acid to the solution in an inert atmosphere.

15. The method of claim 9 further comprising:
drying the precipitate in a vacuum environment at a temperature in a range between 0 and 200 degrees Centigrade (C.).

* * * * *

UNITED STATES PATENT AND TRADEMARK OFFICE
CERTIFICATE OF CORRECTION

| | |
|---|---|
| PATENT NO. | : 9,745,202 B2 |
| APPLICATION NO. | : 14/731607 |
| DATED | : August 29, 2017 |
| INVENTOR(S) | : Jie Song, Yuhao Lu and Long Wang |

It is certified that error appears in the above-identified patent and that said Letters Patent is hereby corrected as shown below:

In the Specification

In Column 8, Line 17, the letter "C" after the word "wherein" and before the word "is" is incorrect. The letter should be a "G".

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*